United States Patent Office 3,497,569
Patented Feb. 24, 1970

3,497,569
TREATMENT OF ALKYLATION FEED STOCK WITH SODIUM, POTASSIUM, OR LITHIUM HYDROXIDE SOLUTION
Samuel R. Stiles, Cresskill, N.J., assignor to Pullman Incorporated, a corporation of Delaware
No Drawing. Filed Feb. 12, 1962, Ser. No. 172,800
Int. Cl. C07c *3/54, 3/52*
U.S. Cl. 260—683.61
12 Claims

ABSTRACT OF THE DISCLOSURE

Alkylation feed stock containing contaminant boiling within the $C_3$ to $C_6$ hydrocarbon range and containing carbonyl sulfide is washed with an aqueous caustic solution of at least 18% caustic and the concentration of the salt contaminant formed in said solution is maintained below 0.5%. The caustic treatment removes contaminants in the alkylation feed stock to the extent that they will not cause deterioration of the alkylation catalyst and will not lead to side reactions that produce sulfate esters and other acidic by-products which degrade the alkylate and cause fouling in the final stages of alkylate distillation.

---

This invention relates to a catalytic process. In one aspect, this invention relates to the treatment of hydrocarbon feed materials which are alkylated to form high quality fuel. More specifically, this invention relates to the treatment of feed to the reaction of an isoparaffin with an olefin in the presence of an acid-type catalyst.

During the alkylation of an isoparaffin with an olefin in the presence of an acid catalyst, which in the case of isobutane alkylation with butylene is illustrated by the equation:

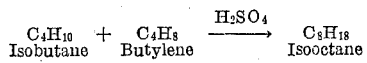

$$C_4H_{10} + C_4H_8 \xrightarrow{H_2SO_4} C_8H_{18}$$
Isobutane + Butylene → Isooctane competing side reactions take place. Of the side reactions, the formation of polymer and the formation of esters are the most troublesome since they lower the yield and quality of alkylate. The first of these reactions, namely the formation of acid esters, is illustrated by the equation:

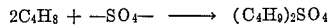

$$2C_4H_8 + -SO_4- \longrightarrow (C_4H_9)_2SO_4$$

and the second reaction is illustrated as follows:

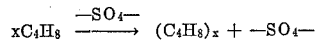

$$xC_4H_8 \xrightarrow{-SO_4-} (C_4H_8)_x + -SO_4-$$

The polymeric material thus formed has a low octane rating and is therefore to be avoided when the preparation of high octane fuel is desired. The ester by-products are undesirable because of their tendency to decompose to corrosive products and carbon or tar which corrode the lines of the apparatus, coat the heating surface, and make it necessary to dismantle, repair and clean the fractionation reboilers, thus interrupting continuous operation.

In order to circumvent the above difficulties, it has been the practice in the art to employ a high excess of isoparaffin to olefin reactant in the reaction zone, i.e., in the order of about 100 to about 400:1. Another measure which has been employed to avoid the above disadvantages is the use of acid catalyst in extremely high concentration; for example, sulfuric acid at a concentration of not less than 96 percent. These methods, however, have not proven entirely satisfactory in all cases for the reasons that the high excess of an isoparaffin in most instances, results in a system requiring high circulation rates which are not always economically advantageous; and even with the high concentration of acid, which necessitates extremely close control in the reactor, the acid consumption is high.

It is thus an object of the present invention to minimize the above difficulties and to provide a commercially feasible and economical process.

Another object of this invention is to provide an alkylation process having improved yields of high quality alkylate.

Still another object is to provide an alkylation process which results in the minimum production of ester and polymeric materials.

Another object is to provide a more efficient alkylation process having reduced circulation rates.

Another object is to prevent contamination of catalysts by poisons which originate in a hydrocarbon feed.

Still another object is to provide a process for the alkylation of an isoparaffin with an olefin which results in an increased yield of higher molecular weight isoparaffin having high octane rating.

These and other objects and advantages of the present invention will become apparent to those skilled in the art from the following description and disclosure.

The feed material to a commercial alkylation process is generally obtained from fractionating, cracking, reforming, coking, and other means of processing crude refinery cuts, such as light naphtha, gasoline, kerosene and similar fractions to obtain most preferably the $C_3$ to $C_5$ fractions. It is also customary to utilize feed stocks of varying composition and containing a variety of saturated and unsaturated compounds. For example, either cracked or straight run refinery gases which are a prime source of alkylation feed stocks, can include paraffins containing from 1 to 6 carbon atoms, isoparaffins including isobutane, isopentane and others of high molecular weight and low boiling olefins and their isomers. The crudes from which these feeds are prepared are often high in sulfur and nitrogen content which, during processing, result in a high production of hydrogen sulfide, carbonyl sulfide, and mercaptan impurities. These impurities are found to be highly corrosive in the fractionation apparatus used for separating fractions in the preparation of suitable feed stocks. Therefore, in order to protect the fractionation apparatus from corrosion and hydrogen blistering, various inhibitors, especially those of the amino type, such as diethanolamine, monoethanolamine, propanolamine, etc., are added while the crude petroleum is separated into fractions or before the cracking process is completed.

It has now been discovered that the sulfur, oxygen and nitrogen-containing compounds resulting from the poccessing of these crudes and the inhibitors along with their resulting addition products, become concentrated in the lighter boiling fractions, for example, in the $C_3$ to $C_5$ fraction because of their distillation or surface wetting properties and capillary entainment. These impurities and/or addition products upon being contacted with sulfuric acid, phosphoric acid, hydrogen fluoride or Friedel-Crafts catalysts, form complex compounds with the acids. It has now been further discovered that these complex compounds, when present in the alkylation reactor, have a deleterious effect on the desired alkylation reaction since they act as a catalyst poison. That is, the complex compounds are pre-disposed to promote and/or enter into the undesirable side reactions resulting in the formation of esters and polymers, thus lowering the yield of high quality alkylate while causing the appearance of gum-forming bodies such as esters in the alkylate effluent. The sulfonated compounds also dilute the acid and thereby increase acid consumption in the reaction and reduce the lead susceptibility of the alkylate to tetraethyl lead by producing disulfides, etc. It has now been discovered that the greater the amount of these sulfur, oxygen and nitrogen contaminants in the feed which form complex compounds with acid upon contact, the greater the yield of low quality alkylate (e.g. dimethylhexanes) and high boiling compounds which raise the ASTM distillation end point.

According to the process of this invention, feed streams to the alkylation reaction zone are treated with an alkaline solution of critical concentration, at least about 18 percent, most preferably an aqueous caustic solution of between about 25 percent and about 40 percent concentration at a temperature of between about 50° F. and about 150° F. under a pressure at least sufficient to maintain liquid phase conditions. The caustic wash is separated from the hydrocarbon stream and the hydrocarbon is then washed with water and the water removed. Feed streams containing isoparaffin, normal paraffin, olefinic or any other material that may enter the alkylation reaction zone, including feeds introduced into the recycle streams, are treated in this manner. By means of this pretreatment, the subsequent alkylation reaction can be conducted in the liquid or vapor phase under the usual temperature and pressure conditions, that is, at a temperature between about 50° F. and about 250° F. under vacuum or at an elevated pressure of up to about 150 p.s.i.g. In the reaction zone, as a result of this pretreatment, the isoparaffin excess can be reduced, if desired, to provide lower volume of material being circulated in the reactor. Because of the present method for the reduction or elimination in the quantity of side reaction products that would normally result from the reaction of these contaminants or impurities with the acid catalyst, it is also possible to eliminate or modify washing procedure formerly applied to the alkylate effluent for removing sulfate ester and olefinic materials. Therefore, by the present process, the alkylate effluent can be directly fractionated into normal paraffin, isoparaffin reactant, and high octane alkylate product fractions substantially free of gum-forming and corrosive contaminants.

While the isoparaffin feed material to the alkylation zone is most preferably isobutane, other saturated compounds such as isopentane, isohexane, etc., can also be employed in this process. Generally, the isoparaffin feed is added to the reaction zone in a mixture containing one or more of these saturated materials together with minor amounts of methane and ethane. It is to be understood, however, that alkylation of aromatics, e.g. benzene, toluene, etc., is also within the scope of this invention.

The olefin reactant in the reaction zone is most preferably propene, butene, pentene or mixtures thereof; however, it is to be understood that other olefins such as ethylene, hexene, etc., can also be employed singly or in admixture, if desired.

The catalysts mentioned above have been discussed in connection with alkylation; however, it is to be understood that the process of the present invention can be applied to feed stocks for other treating processes such as reforming and cracking high molecular weight hydrocarbons which process also use catalysts which lend themselves to reactions involving the carbonium ion.

The alkaline wash material used in the pretreatment of feeds in the present invention is preferably an aqueous caustic solution of from 18 percent to 50 percent concentration, containing not more than 0.5 percent salts of the acid gases such as sulfides, carbonates, etc., and most preferably containing none of these salt impurities. The hydrocarbon fractions may contain acid gases such as hydrogen sulfide, carbon dioxide, etc., which, when extracted with caustic, produce the coresponding salts. These salts interfere with the extraction or dissolution of other contaminants such as mercaptans, carbonyl sulfides, ammonium complexes, etc. Therefore, it is important to maintain the salt concentration below about 0.5 percent in order that these salts do not reduce or interfere with the efficiency of the extraction of these deleterious contaminants and to prevent "salting out" or inability to extract the weaker acids from the feed stock. While a low concentration of caustic in the wash, up to less than 18 percent, is suitable for removing hydrogen sulfide and mercaptan contaminants; the amine, carbonyl sulfide and other oxygen and nitrogen bearing contaminants are not removed unless a solution of high alkalinity is employed, e.g., a solution having at least 18 percent, preferably at least 20 percent alkaline concentration. Other alkaline materials which can be used to replace the caustic, totally or in part, include lithium hydroxide and potassium hydroxide, in concentrations varying between about 18 percent to about 50 percent.

The amount of alkali in the wash employed is present in at least a stoichiometric amount with the contaminant or contaminants to be removed, although an excess of alkali is preferable, and the wash solution is preferably present in a volume ratio of between about 10:1 and about 1:10 with respect to the volume of feed undergoing treatment.

Any convenient technique may be employed to carry out the alkaline washing step, for example, washing with agitation, recirculation by or through mixing devices external to the separating device or by recirculating by or through mixing devices adjacent to or concurrent with separating devices or by static distribution within the mixing and separation device. The separating device may be a tower drum containing packing or special devices to accomplish separation by gravity, contrifugal impingement, electrical, electrostatic force or combinations thereof. One method for obtaining a suitable alkylate feed is effected by subjecting a crude oil petroleum liquid fraction containing a major portion of aromatics and aliphatic material to a cracking process to produce isomeric and/or olefinic compounds and then separating the lower boiling hydrocarbons from the higher boiling material. The lower boiling hydrocarbons which contain material most suitable for alkylation, together with sulfur, oxygen or nitrogen-bearing contaminants such as hydrogen sulfide, ammonia complex, carbon dioxide, carbonyl sulfide, mercaptans, etc., are then separated into a $C_3$ to $C_5$ fraction by distilling at the proper boiling point in accordance with the materials desired for alkylation feed. Because the fraction containing these lower boiling materials also contains a substantial amount of hydrogen sulfide and mercaptan contaminants, it is highly corrosive to the distillation apparatus; therefore, prior to the distillation an amine inhibitor, e.g., diethanol amine, is added to the vaporous overhead in the distillation zone. The vaporous fraction is then treated to extract and remove combined sulfur, nitrogen and oxygen compounds which would include carbon dioxide by washing with a dilute caustic solution, for example, with a dilute caustic solution of up to about 10 percent concentration. The resulting $C_3$ to $C_5$ fraction, which in previous practice has been employed directly as the feed to an alkylation reaction is, by the process of the present invention, washed with concentrated alkaline solution of between 18 percent to 50 percent concentration prior to alkylation.

Preferably the isoparaffin feed stock fraction prior to washing with concentrated alkaline solution, has a boiling point between about −55° F. and about 100° F., contains propane, isobutane, n-butane and isopentane with small amounts of combined sulfur, nitrogen and oxygen compound contaminants. The olefin feed stock prior to concentrated alkaline wash has a boiling point between about −55° F. and about 100° F. and preferably contains a major portion of butylene together with sulfur-containing contaminants and a small amount of nitrogen-containing contaminants. The contaminant portion of both streams is, for example, about 0.3 percent, although higher or lower concentrations are often employed.

By the process of the present invention, these feed stocks are introduced into a treating apparatus, comprising a washing drum, contactor or tower containing, for example, about 35 percent sodium hydroxide in aqueous solution. The isoparaffin and olefin feeds preferably can be washed in separate treating apparatus for convenience in subsequent processing. The feed fraction can be passed countercurrent to the concentrated alkaline solution in the washing tower as a gas or as a liquid. A gaseous feed can be liquified and the resulting liquid mixture agitated by means of a stirrer or suitable mixing device operating at a pressure drop of between 5 p.s.i.g. and about 50 p.s.i.g. The washed $C_3$ to $C_5$ fractions are then separated from the washing medium by settling, coalescing or phase separation. The separated hydrocarbons are then washed with water to remove entrained alkaline material and impurities contained in the alkaline material and then separate the water solution by coalescing prior to alkylation of the hydrocarbons.

When the impurities in the $C_3$ to $C_5$ fraction are low, for example a few parts per million, so that the consumption and disposal of the alkaline material is not a problem, a single alkaline wash of between about 18 percent and about 50 percent alkaline concentration followed by water wash can be used (for example, a caustic wash of 32°–40°Bé).

When the acid gas impurities in the $C_3$ to $C_5$ fraction, for example, hydrogen sulfide and carbon dioxide, are so high that excessive quantities of alkaline material are required to maintain the 0.5 weight percent limitation in the caustic solution, a pre-wash is recommended to extract excessive amounts of these impurities. For this purpose, an alkaline pre-wash as low as 5 percent concentration can be employed. However, this pre-wash treatment with dilute alkaline material serves only to remove acid gases and mercaptans. In some cases when the alkaline material in the pre-wash is consumed at a high rate, a regenerative treating system can be employed to extract the acid gases. The alkaline solution can be removed from the washing zone and regenerated by known methods such as fractionation, open steam stripping, or oxidation.

As with the single wash system, the process whereby the $C_3$ to $C_5$ fraction is first washed with dilute alkaline material in a pre-wash stage and then washed with concentrated alkaline material, the washed material is separated from the last alkaline washing zone whereupon it is subjected to water-washing and coalescing prior to introduction into the alkylation reactor. The water-washed, coalesced material can be directly introduced into the alkylation reaction zone or can be further separated into fractions prior to alkylation. The olefinic material obtained from a refinery cut boiling between about −55° F. and about 100° F., treated in the same manner, is then introduced into the alkylation reaction zone for reaction with the isoparaffin under conditions outlined above.

A preferred embodiment of the present invention is to subject the $C_3$ to $C_5$ fraction from the fractionation zone to washing with a dilute aqueous solution of caustic (5 percent to 15 percent sodium hydroxide concentration) to remove a major portion of the mercaptans and acid salts from the fraction prior to washing with the concentrated aqueous solution of caustic (20 percent to 30 percent sodium hydroxide concentration). However, it is to be understood that the dilute pre-wash can be omitted and the concentrated wash used along when the mercaptan and acid gas content is low, for example, below 0.001 percent, in which case the consumption of caustic is within practical limits. The wash with concentrated alkaline solution can be carried out in one or more zones, although generally when the $C_3$ to $C_5$ fraction is subjected to pre-wash with dilute alkaline solution, a single wash with concentrated alkaline solution is sufficient. When the dilute pre-wash is omitted and the acid gas content is relatively high, for example above 0.03 percent, it is recommended that multi-zone wash with a concentrated alkaline solution be used to ensure maximum removal of the contaminants.

While diethanolamine is an inhibitor commonly added to crude petroleum to prevent corrosion in fractionation apparatus, other inhibitors such as dimethanolamine, tributylamine, dipropanolamine, p-hydroxyphenyl morpholine, mono- and triethanolamine, methylethylamine, propylamine, mono- and dibenzyl-p-amino phenol, etc., are also commonly used for this purpose. Also, natural contaminants comprising carbonyl sulfide and carbonyl sulfide-ammonia complexes are found in cracking products in many cases. These contaminant inhibitors form complex compounds with acid-type catalysts, such as, for example with sulfuric acid, aluminum chloride, etc., and are thus detrimental to the alkylation reaction and must be treated with the alkaline solution in accordance with the procedure set forth above.

The concentration of the alkaline wash solution is critical in the present process for it has been noted, and the following data indicate, that when the concentration of the hydroxide falls below 18 percent, even though sulfur contaminants, i.e., mercaptans and hydrogen sulfide are removed, sufficiently large amounts of other contaminants are allowed to pass into the reaction zone resulting in the undesirable side reactions of polymerization and ester formation.

The following examples are presented for comparative and illustrative purposes and are not to be construed as in any way limiting to the scope of the present invention.

EXAMPLE 1

An alkylate feed stock from a crude distillation operation containing 1.1 percent propane, 30 percent isobutane, 60 percent n-butane, 2 percent pentanes and about 0.15 percent of contaminants comprising alkyl sulfides, hydrogen sulfide, carbonyl sulfide (containing a trace amount of ammonium carbonyl sulfide), mercaptan and monoethanol amine is passed to a washing tower wherein at a temperature of between about 70° F. to 85° F., under atmospheric pressure, the feed stock is washed with an aqueous solution of sodium hydroxide of 10 percent concentration. The feed is washed to reduce the contaminant concentration to less than 0.03 percent, in this particular example, to a concentration of about 130 parts per million and then separated from the dilute caustic washing zone.

The washed feed is then divided into four equal portions. One portion is washed again under the same conditions with 10 percent aqueous caustic solution; another is washed under the same conditions with 17 percent aqueous caustic solution; the third portion is washed under the same conditions with 20 percent aqueous caustic solution and the fourth portion is washed under the same conditions with 25 percent aqueous caustic solution. Each of the four portions is then separately subjected to a water-wash to separate the caustic and impurities contained therein, followed by coalescing to remove the resulting water solution. The coalesced samples are then separately subjected to alkylation with butylene free of contaminants at a temperature of about 70° F.

in the liquid phase in the presence of 92 percent sulfuric acid (cold titratable acidity). The alkylation is performed in a system which maintains a reactor performance index (based on isobutane concentration, space velocity and the mixing content) of 163.5. The conditions for maintaining this performance index include an acid to olefin volume ratio of about 10:1 and an isoparaffin:olefin ratio in the reactor of about 20:1. The characteristics of the alkylate product are reported in Table I.

It is to be understood, in the above examples, that a paraffin feed, containing unsaturated materials such as, for example butylene, propylene, etc., can be substituted for the saturated paraffin feed employed above and that such feed containing unsaturates can be subjected to the washing treatment described above to remove the contaminants and sodium salts of the contaminants which are formed upon contact with the concentrated sodium hydroxide solution.

TABLE I

| Treated alkylate feed | Contaminants in alkylate feed in p.p.m. | | Fouling and corrosion in distillation of alkylate | $H_2SO_4$ consumption, lbs./bbl. of 96 octane alkylate produced | $(C_2H_5)_4Pb$ susceptability for the 96 octane product | ASTM end point of the 96 octane product (° F.) |
|---|---|---|---|---|---|---|
| | Carbonyl sulfide | Mercaptan | | | | |
| Portion 1—washed with 1% NaOH. | 130 | 30 | Severe | 20 | 11 | 415 |
| Portion 2—washed with 17% NaOH. | 35 | 25 | Moderate | 20 | 13 | 400 |
| Portion 3—washed with 20% NaOH. | <0.1 | 2 | None | 10 | 15 | 385 |
| Portion 4—washed with 25% NaOH. | <0.1 | 0 | ___do___ | 8 | 16 | 380 |

EXAMPLE 2

An alkylate paraffin feed stock from a crude fraction containing $C_3$ to $C_5$ paraffins and about 1 percent of contaminants comprising hydrogen sulfide, carbonyl sulfide, mercaptan, and monoethanolamine and an alkylate olefin feed stock containing predominantly butylenes and about 0.7 percent of the above-mentioned contaminants are separately washed at a temperature of 75° F. under atmospheric pressure with an alcoholic solution of sodium hydroxide in 10 percent concentration (the alcoholic solution is a 40 percent aqueous methanol solution).

Both feed stocks are washed until the contaminant concentration is reduced to 0.05 percent. Half the volume of both feed stocks are then subjected to separate washing with a concentrated caustic solution in 40 percent aqueous methanol. The concentration of caustic in solution is 20 percent. The feed stocks washed with concentrated caustic are then separated and washed with water, separated from the water-washing zone and passed to a cascade alkylation reactor wherein, in the presence of sulfuric acid in about 92 percent concentration (cold titratable acidity), the feeds are reacted at a temperature of about 80° F. The alkylation is performed in a system which maintains a reactor performance index of 152.5. The conditions for maintaining this performance include an acid to olefin ratio of about 10:1 and an isoparaffin to olefin ratio in the reactor of about 18:1. The alkylate product mixture is withdrawn from the alkylation zone and distilled to separate a 93 octane alkylate from lower boiling materials. The characteristics of this product are reported in Table II. The remaining portions of the feed stocks which are washed with dilute caustic and water but not with the concentrated 20 percent caustic solution, are then subjected to alkylation under conditions identical to those set forth above to provide a 93 octane alkylate. The characteristics of this alkylate product are also reported in Table II for the purpose of comparison.

TABLE II

| | $(C_2H_5)_4Pb$ susceptability | Pounds acid consumption in alkylation zone/ bbl. of alkylate produced | ASTM end point (° F.) | Fouling during distillation |
|---|---|---|---|---|
| 93 octane alkylate obtained from feeds washed with 20% NaOH solution. | 14 | 21 | 430 | None. |
| 93 octane alkylate obtained from feeds washed only with 10% NaOH solution. | 10 | 38 | 475 | High. |

EXAMPLE 3

An alkylate feed stock from a crude petroleum fraction containing $C_3$ to $C_5$ paraffins and olefins and about 1 percent of contaminants comprising hydrogen sulfide, carbonyl sulfide, mercaptan, and monoethanol amine is washed at a temperature of 80° F. under atmospheric pressure with an aqueous solution of sodium hydroxide in 12 percent concentration. The distribution of the hydrocarbons in the feed stocks is as follows:

| | Liquid volume, percent |
|---|---|
| Methane | 0.1 |
| Ethane | 1.0 |
| Ethylene | 0.05 |
| Propane | 15.25 |
| Propylene | 12.7 |
| N-butane | 12.25 |
| Isobutane | 38.5 |
| Butylenes | 19.75 |
| Pentanes and heavier | 0.4 |

The feed stock is washed until the contaminant concentration is reduced to 0.03 percent and separated from the washing solution. Half the volume of this feed stock is then subjected to additional washing with a concentrated aqueous caustic solution containing about 22 percent caustic. The contaminants remaining in the feed stock, upon being contacted with the concentrated caustic, are converted to sodium salts and this salt concentration in the caustic wash is maintained below 0.5 percent, preferably in this case, below 0.1 percent by withdrawing spent caustic wash and supplying fresh caustic to the washing tower. The washing treatment is continued for a period of about 20 minutes after which the feed stock is separated from the water-washing zone and washed with water to remove residual caustic and contaminants associated therewith. The water-washed feed stock is then separated from the water and passed through a coalescer to remove small amounts of water entrained therewith.

The portion of feed stock washed with concentrated caustic solution and the portion of feed stock which has not been subjected to the concentrated caustic wash are each passed to a separate distillation column wherein isobutane is separated as a vaporous fraction from butylene which remains as a liquid. The vapor fractions from both fractionation zones are separately condensed and subjected to alkylation with the respective liquid fractions in a cascade, auto-refrigerated alkylation reactor at a temperature of about 75° F. in the presence of about 92 percent sulfuric acid (cold titratable acidity) under liquid phase conditions. The alkylation is performed in a system which maintains a reactor performance index of 158. The conditions for maintaining this performance index include an isobutane:butylene ratio of about 28:1. The alkylate product mixture in each of the alkylation zones is withdrawn and separately distilled to recover a 93 octane alkylate from lower boiling materials.

The alkylate product obtained from the feed stock which has not been washed with concentrated caustic solution has a lead susceptibility of about 8 and an ASTM end point of about 485° F. The alkylate product obtained from the feed stock which has been washed with 22 percent caustic, has a lead susceptibility of 15 and an ASTM end point of about 415° F. It is also observed that the acid consumption in the alkylation zones is about 15 pounds higher, based on alkylate produced in the case of the feed stock which is only washed with the 12 percent caustic solution.

As set forth above, the concentrated alkaline wash is carried out with an aqueous solution, or with alcoholic solutions such as solutions of methanol, propanol, butanol, etc. However, it is to be understood that any solvent which is inert to the reaction mixture and which is easily separated therefrom, can be substituted in place of water or the alcohol, if desired. It is also to be understood that other departures from the specific process described in the examples, such as multi-zone concentrated caustic wash and/or multi-zone dilute caustic wash together with a final caustic wash having a critical concentration of at least 18 percent caustic, is also within the scope of this invention; and that other alkylation processes, wherein the paraffin and/or olefin reactant is a $C_3$, $C_5$ or $C_6$ hydrocarbon and that processes other than alkylation which involve the formation of a carbonium ion and contamination of catalytic materials by their formation of complex compounds with the sulfur-, nitrogen- and/or oxygen-containing contaminants, can be enhanced by washing the feeds to these processes with the concentrated alkaline solutions herein described prior to their reaction in a reaction zone.

Having thus described my invention I claim:

1. A method for preparing alkylation feed stock which comprises: washing with a solution of alkaline material a hydrocarbon fraction containing predominantly $C_3$ to $C_6$ hydrocarbons and a minor amount of a contaminant boiling within the $C_3$ to $C_6$ hydrocarbon range and containing carbonyl sulfide, said contaminant forming a salt upon contact with the alkaline material and being selected from the group consisting of oxygen-, sulfur- and nitrogen-containing contaminants, said solution of alkaline material being selected from the group consisting of hydroxides of sodium, lithium and potassium and the concentration of the hydroxide in solution being at least 18 percent; maintaining the concentration of the salt contaminant in the washing medium below about 0.5 percent; washing said hydrocarbon fraction to produce an alkylation feed stock containing less than a few parts per million of contaminant so that the resulting feed stock is capable of producing an alkylate product of improved lead susceptibility and ASTM end point.

2. A method for preparing alkylation feed stock which comprises: washing with a solution of alkaline material a hydrocarbon fraction containing predominantly $C_3$ to $C_6$ hydrocarbons and a minor amount of a contaminant boiling within the $C_3$ to $C_6$ hydrocarbon range and containing carbonyl sulfide, said contaminant forming a salt upon contact with the alkaline material and being selected from the group consisting of sulfur-, oxygen- and nitrogen-containing contaminants, said solution of alkaline material being selected from the group consisting of hydroxides of sodium, lithium and potassium and the concentration of the hydroxide in solution being between 18 and 50 percent; maintaining the concentration of salt contaminants in the washing medium below about 0.5 percent; washing said hydrocarbon fraction to produce an alkylation feed stock containing less than a few parts per million of contaminant so that the resulting feed stock is capable of producing an alkylate product of improved lead susceptibility and ASTM end point.

3. A method for preparing alkylation feed stock which comprises: washing with a 2 percent to 17 percent solution of alkaline material being selected from the group consisting of hydroxides of sodium, lithium and potassium, a hydrocarbon fraction containing predominantly $C_3$ to $C_6$ hydrocarbons and more than 0.03 percent of a contaminant boiling within the $C_3$ to $C_6$ hydrocarbon range and containing carbonyl sulfide, said contaminant forming a sale upon contact with the alkaline material and being selected from the group consisting of oxygen-, sulfur- and nitrogen-containing contaminants to reduce the concentration of the contaminants to at least 0.03 percent; passing the washed hydrocarbon fraction to a second zone wherein the fraction is washed with an 18 percent to 50 percent solution of alkaline material being selected from the group consisting of hydroxides of sodium, lithium and potassium to remove additional contaminants; maintaining the concentration of the salt contaminants in the more concentrated alkaline wash below about 0.5 percent; washing said hydrocarbon fraction to produce an alkylation feed stock containing less than a few parts per million of contaminant so that the resulting feed stock is capable of producing an alkylate product of improved lead susceptibility and ASTM end point.

4. A method for preparing alkylation feed stock which comprises: washing with a solution of alkaline material a hydrocarbon fraction containing predominantly $C_3$ to $C_6$ hydrocarbons and a minor amount of contaminant boiling within the $C_3$ to $C_6$ hydrocarbon range and containing carbonyl sulfide, said contaminant forming a salt upon contact with the alkaline material and being selected from the group consisting of oxygen-, sulfur- and nitrogen-containing contaminants, said solution of alkaline material being selected from the group consisting of hydroxides of sodium, lithium and potassium and the concentration of the hydroxides in solution being from about 25 percent to 50 percent to reduce the contaminant concentration in the hydrocarbon fraction; passing the washed hydrocarbon fraction to a second zone wherein the fraction is washed with an 18 percent to 50 percent solution of an alkaline material being selected from the group consisting of hydroxides of sodium, lithium and potassium to remove additional contaminants; maintaining the concentration of the salt contaminants in both of the alkaline wash solutions below about 0.5 percent; and subjecting the resulting hydrocarbon fraction to water-washing to separate alkaline material and contaminants contained therein from the hydrocarbon fraction to produce a hydrocarbon fraction alkylation feed stock containing less than a few parts per million of contaminant and capable of producing an alkylate product having improved lead susceptibility and ASTM end point.

5. A method for preparing alkylation feed stock to an alkylation reactor which comprises: washing with an alkaline solution a hydrocarbon fraction containing predominantly $C_3$ to $C_6$ hydrocarbons and a minor amount of contaminant boiling within the $C_3$ to $C_6$ hydrocarbon range and containing carbonyl sulfide, said contaminant forming a salt upon contact with the alkaline material and being selected from the group consisting of oxygen-, sulfur- and nitrogen-containing contaminants, said solution of alkaline material being selected from the group consisting of hydroxides of sodium, lithium and potassium, and the concentration of the salt contaminants in the alkaline solution being maintained below about 0.5 percent and the concentration of the hydroxide in the solution being between 18 percent and about 50 percent; washing the alkaline hydrocarbon fraction with water to remove alkaline components and contaminants associated therewith and to reduce the concentration of contaminants in the hydrocarbon fraction to less than a few parts per million; removing the water wash from the hydrocarbon fraction to produce a hydrocarbon alkylation feed stock capable of producing alkylate of improved lead susceptibility and ASTM end point.

6. The process of claim 5 wherein the alkaline solution is an aqueous solution.

7. A method for preparing alkylation feed stocks to an alkylation reactor which comprises: separately washing with solutions of alkaline material a hydrocarbon fraction containing predominantly paraffinic $C_3$ to $C_6$ hydrocarbons and a minor amount of a mixture of contaminants boiling within the $C_3$ to $C_6$ hydrocarbon range and containing carbonyl sulfide, said contaminant forming a salt upon contact with the alkaline material and being selected from the group consisting of sulfur-, oxygen- and nitrogen-containing contaminants and an olefinic fraction containing predominantly olefinic $C_3$ to $C_6$ hydrocarbons and a minor amount of a mixture of contaminants boiling within the $C_3$ to $C_6$ hydrocarbon range and containing carbonyl sulfide, said contaminant forming a salt upon contact with the alkaline material and being selected from the group consisting of sulfur-, oxygen- and nitrogen-containing contaminants, said solution of alkaline material being selected from the group consisting of hydroxides of sodium, lithium and potassium and having a concentration of hydroxide in solution of between about 20 percent and about 40 percent; maintaining the concentration of the salt contaminants in the alkaline solution below about 0.5 percent; separately washing each of the $C_3$ to $C_6$ fractions with the alkaline solution until the contaminant concentration is reduced below a few parts per million; withdrawing from each of the $C_3$ to $C_6$ hydrocarbon fractions the alkaline components and contaminants associated therewith; washing each of the hydrocarbon fractions with water; separating each of the water-washed fractions from the water wash and separately introducing the hydrocarbon fractions into the alkylation reactor wherein the fractions are contacted and reacted in the presence of sulfuric acid as a catalyst to produce an alkylate product of improved lead susceptibility and ASTM end point.

8. The process of claim 7 wherein the isoparaffin in the paraffin fraction is predominantly isobutane.

9. A method for preparing alkylation feed stocks to an alkylation reactor which comprises: separately washing with a solution of sodium hydroxide an isobutane fraction containing a minor amount of contaminant boiling within the $C_3$ to $C_6$ hydrocarbon range and containing carbonyl sulfide, said contaminant forming a salt upon contact with the sodium hydroxide and selected from the group consisting of oxygen-, sulphur- and nitrogen-containing contaminants and a butylene fraction containing a minor amount of contaminant boiling within the $C_3$ to $C_6$ hydrocarbon range and containing carbonyl sulfide, said contaminant forming a salt upon contact with the sodium hydroxide and being selected from the group consisting of oxygen-, sulfur- and nitrogen-containing contaminants; maintaining the concentration of the salt contaminants in the sodium hydroxide solution below about 0.5 percent and the concentration of the hydroxide in solution between about 20 percent and about 40 percent; washing the isobutane fraction and the butylene fraction until the contaminant concentration is reduced below a few parts per million; separately withdrawing the washed isobutane and butyleneractions from the sodium hydroxide solutions; separately washing the alkaline washed isobutane fraction and the butylene fraction with water to remove residual alkaline components and contaminants associated therewith; passing each of the water-washed fractions through a separate coalescer to remove entrained water and separately introducing the isobutane fraction and the butylene fraction to the reactor for alkylation therein in the presence of sulfuric acid to produce an alkylate product having an improved lead susceptibility and improved ASTM end point.

10. The process of claim 9 wherein the alkaline solution is an aqueous solution; washing is carried out at a temperature between about 50° F. and about 100° F. and the alkylation temperature and the water-wash is carried out at substantially the same temperature as the alkaline wash.

11. A method for preparing isoparaffinic and olefinic alkylation feed stocks to an alkylation reactor which comprises: washing with an alkaline solution to hydrocarbon fraction containing predominantly $C_3$ to $C_6$ olefinic and paraffinic hydrocarbons and a minor amount of contaminant boiling within the $C_3$ to $C_6$ hydrocarbon range and containing carbonyl sulfide, said contaminant forming a salt upon contact with the alkaline material and being selected from the group consisting of sulfur-, oxygen- and nitrogen-containing contaminants, said solution of alkaline material being selected from the group consisting of hydroxides of sodium, lithium and potassium and the concentration of the hydroxides in solution being between 18 and 50 percent, maintaining the concentration of salt contaminants in the alkaline solution below about 0.5 percent; withdrawing the alkaline washed hydrocarbon fraction and washing said fraction with water to remove residual alkaline components and contaminants associated therewith to reduce the contaminant concentration of the hydrocarbon fraction to below a few parts per million; separating the water-washed fraction from the water; fractionating the hydrocarbon fraction to separate an olefin fraction and a paraffin fraction; and separately introducing the olefin fraction and the paraffin fraction into an alkylation zone for contact and reaction therein to produce an alkylate product having an improved lead susceptibility and an improved ASTM end point.

12. A method for preparing alkylation feed stock which comprises: washing with an aqueous solution of sodium hydroxide a hydrocarbon fraction containing predominantly $C_3$ to $C_6$ hydrocarbons and a minor amount of a contaminant boiling within the $C_3$ to $C_6$ hydrocarbon range and containing carbonyl sulfide, said contaminant forming a salt upon contact with the alkaline material and being selected from the group consisting of oxygen-, sulfur- and nitrogen-containing contaminants, the concentration of sodium hydroxide in the aqueous solution being at least 18 percent and the concentration of the salt contaminant in the washing medium being maintained below about 0.5 percent; washing said hydrocarbon fraction to produce an alkylation feed stock containing less than a few parts per million of contaminant so that the resulting feed stock is capable of producing an alkylate product of improved lead susceptibility and ASTM end point.

(References on following page)

References Cited

UNITED STATES PATENTS

| | | | |
|---|---|---|---|
| 1,936,210 | 11/1933 | Retaillau | 208—229 |
| 2,342,364 | 2/1944 | Parker | 260—682 |
| 2,374,996 | 5/1945 | Herthel | 260—683 |
| 2,980,606 | 4/1961 | Van Beest et al. | 208—229 |
| 2,146,353 | 2/1939 | Rosebaugh | 208—226 |
| 2,410,233 | 10/1946 | Legatski | 208—230 |
| 2,769,765 | 11/1956 | Betts et al. | 208—230 |
| 3,011,970 | 12/1961 | Goodman et al. | 208—230 |
| 2,924,629 | 2/1960 | Donaldson | 260—683.75 |

OTHER REFERENCES

Voreck et al., Extraction of Mercaptans by means of Adsorption, Petroleum Refiner, vol. 30, No. 3, March 1957, pp. 126–129.

DELBERT E. GANTZ, Primary Examiner

G. J. CRASANAKIS, Assistant Examiner

U.S. Cl. X.R.

260—676, 677